United States Patent Office 3,527,793
Patented Sept. 8, 1970

3,527,793
PHENYLGLYCINE DERIVATIVES
Charles Truman Holdrege, Camillus, N.Y., assignor to Bristol-Myers Company, New York, N.Y., a corporation of Delaware
No Drawing. Original application Aug. 18, 1967, Ser. No. 661,520, now Patent No. 3,464,985, dated Sept. 2, 1969. Divided and this application Jan. 30, 1968, Ser. No. 701,546
Int. Cl. C07c 101/44
U.S. Cl. 260—471   9 Claims

ABSTRACT OF THE DISCLOSURE 2,3 or 4-acetamido-substituted-phenylglycines are useful intermediates in the preparation of 7-substituted-amino-cephalosporanic acids, which compounds are valuable as antibacterial agents. D-α-amino-4-acetamidophenylacetic acid for example, is used to produce 1-[D-α-amino-4'-aectamidophenylacetamido] - cephalosporanic acid, a compound valuable in the treatment of bacterial infection in mammals, including man.

CROSS-REFERENCE TO RELATED APPLICATIONS

This application is a division of our application Ser. No. 661,520, filed Aug. 18, 1967, now Pat. No. 3,464,985.

BACKGROUND OF THE INVENTION

Field of the invention

This invention relates to amino acids useful as intermediates in the preparation of 7-substituted-aminocephalosporanic acid derivatives which compounds are antibacterial agents.

Description of the prior art

The acetamido-substituted-phenylglycines of the instant invention and their usefulness as intermediates in the preparation of the corresponding cephalosporanic acid derivatives were heretofore unknown in the art.

SUMMARY OF THE INVENTION

The compounds of the present invention are characterized as having the formulas selected from the group consisting of:

(A)
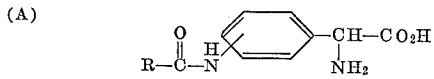

in which R is (lower)alkyl; and (B)
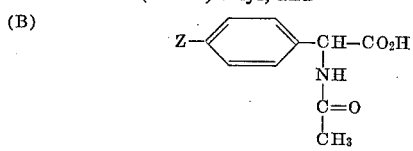

in which Z is —NH$_2$ or NO$_2$; and (C)
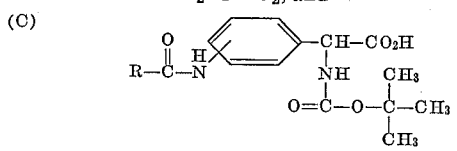

This invention relates to novel derivatives of phenylglycine which are valuable as intermediates in the preparation of anti-bacterial agents and more particularly, to acetamido-substituted-phenylglycines which are useful in the preparation of 7-[D-α-amino-(acetamidophenylacetamido)]-cephalosporanic acids which compounds are useful in the treatment of bacterial infections in mammals, including man.

There is provided, according to the present invention, the compounds having the formulas (A)
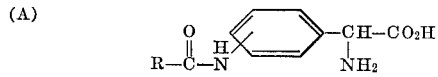

wherein R is (lower)alkyl; and (B)
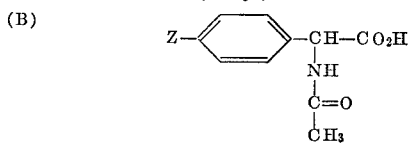

wherein Z is —NH$_2$ or NO$_2$; and (C)
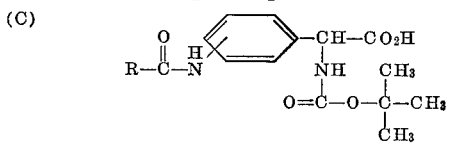

wherein R is (lower)alkyl.

The term "(lower)alkyl" as used herein means both straight and branched chain saturated aliphatic hydrocarbon radicals having from 1 to 10 carbon atoms such as methyl, ethyl, propyl, isopropyl, butyl, isobutyl, t-butyl, amyl and hexyl.

Compounds having the formula

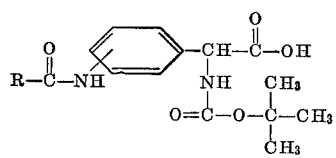
(III)

wherein R is (lower)alkyl; or its functional equivalent as an acylating agent for a primary amine; are compounds used as intermediates in the preparation of 7-(D-α-amino - (acetamidophenylacetamido)] - cephalosporanic acids.

The term "functional equivalent" as an acylating agent for a primary amine is further defined for the purpose of the present invention to include the corresponding acid halides, acid anhydrides, including other mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g. with p-nitro-phenol, 2,4-dinitrophenol, thiophenol, thioacetic acid) may be used or the free acid itself may be coupled with 7-aminocephalosporanic acid after first reacting said free acid with N,N'-dimethylchloroformiminium chloride [cf. Great Britain 1,008,170 and Novak and Weichet, Experientia XXI/6, 360 (1965)] or by use of enzymes or of an, N,N'-carbonyldiimidazole or an N,N'-carbonylditriazole [cf. South African patent specification 63/2684] of a carbodiimide reagent especially N,N'-dicyclohexylcarbodiimide, N,N'-diisopropylcarbodiimide or N-cyclohexyl-N'-(2-morpholinoethyl)-carbodiimide; [cf. Sheehan and Hess, J. Amer. Chem. Soc. 77, 1067, (1955)], or of alkynylamine reagent [cf. R. Buijle and H. G. Viehe, Angew. Chem. International Edition 3, 582 (1964], or of a ketenimine reagent [cf. C. L. Stevens and M. E. Mond, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the anhydride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivaties. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The byproduct, imidazole, precipitates and may be separated and the imidazolide isolated, but this is not essential. The methods for carrying out these reactions to produce a cephalosporin and the methods used to isolate the cephalosporin so-produced are well-known in the art (cf. U.S. Pats. Nos. 3,079,314; 3,117,126 and 3,129,224 and British Pats. Nos. 932,644; 957,570 and 959,054).

In the compounds of the present invention, the carbon bearing the amino group on the α-carbon adjacent to the carbonyl function is an asymetric carbon atom. Thus these compounds can exist in two optically active isomeric forms (the D- and L-diastereoisomers), as well as in a mixture of the two optically active forms, all of which are included in the present invention.

These compounds and some of the intermediates of these compounds, and the processes for their preparation are new and heretofore unknown.

The process for the preparation of the compound having the formula

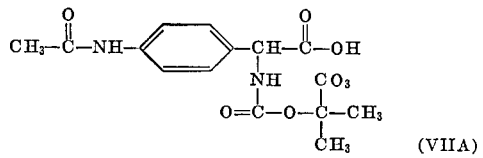

comprises the consecutive steps of (a) Mixing D-(-)-2-phenylglycine with an excess of acetic anhydride or acetyl halide, preferably in about a 1:2 molar ratio, in the presence of a base such as an alkali metal hydroxide, in a non-reactive solvent or a slow-reactive solvent, preferably water, subsequently followed by acidification to prodcce a compound having the formula

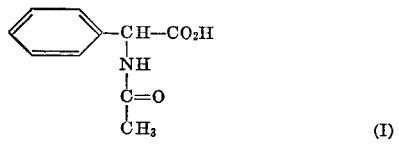

and (b) Nitrating compound I by dissolving it in concentrated sulfuric acid and nitric acid at temperatures about 0° C. to produce a compound having the formula

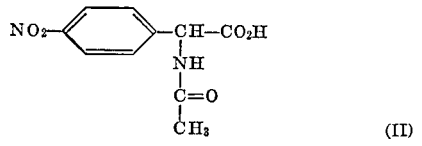

and (c) Reducing the nitro compound by catalytic hydrogenation in an inert solvent such as an alcohol (ethanol, etc.), benzene, toluene, tetrahydrofuran, chloroform, or the like, but preferably ethanol, with a catalyst such as platinum oxide, palladium on charcoal, or the like, to produce a compound having the formula

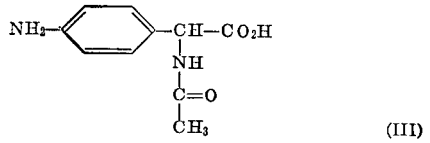

and (d) Hydrolyzing the above amino compound (III) with an acid such as hydrochloric acid, preferably with the aid of heat, to produce a compound having the formula

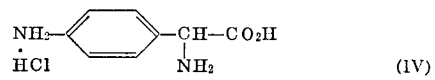

and (e) Selectively monoacylating the diamino compound (IV) by treatment with thioacetic acid at about pH 4-6 in aqueous solution to produce a product having the formula

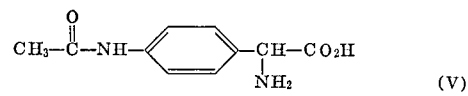

which product is known as D-α-amino-4-acetamidophenylacetic acid.

Substituted in the procedure of step (c) of the above process for the D-α-acetamido-4-nitrophenylacetic acid used therein of D-α-amino-3-nitrophenylacetic acid produces D-α-amino-3-amino-phenylacetic acid. Subsequent substitution in the procedure of step (e) of the above process for the D-α-amino-4-aminophenylacetic acid used therein of D-α-amino-3-aminophenylacetic acid produces D-α-amino-3-acetamidophenylacetic acid.

D-α-amino-2-acetamidophenylacetic acid can be prepared by the procedures described in Examples X through XIII.

The compounds having the formula

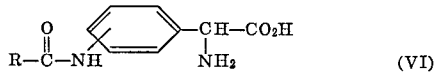

wherein R is (lower)alkyl; are further treated with an excess of t-butoxycarbonyl azide, preferably about a 10% molar excess, an excess of magnesium oxide, preferably about 100% molar excess, in an aqueous dioxane solution, preferably about 50% dioxane, to produce the corresponding product having the formula

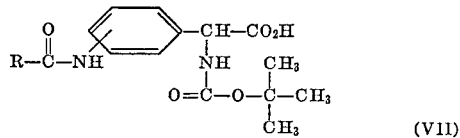

A compound of the Formula VII is converted to a compound having the formula

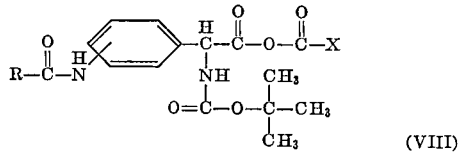

wherein X is —CCl₃ or —O—(lower)alkyl, and R is (lower)alkyl; by the treatment of compound VII with about an equimolar quantity of trichloroacetyl halide, preferably trichloroacetyl chloride, or about an equimolar quantity of ethyl chloroformate, in the presence of a base, preferably an equimolar quantity of triethylamine, to produce in situ the mixed anhydride VIII which is subsequently reacted with 7-aminocephalosporanic acid to produce a compound having the formula

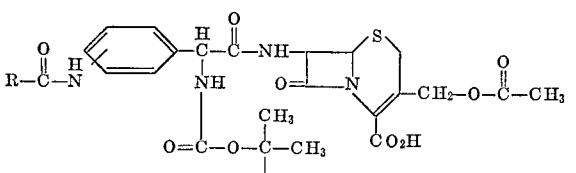

wherein R is (lower)alkyl.

Compound IX is treated with a concentrated aqueous solution of formic acid, about 40% to 60%, or with concentrated trifluoroacetic acid at about —10° to 50° C., but preferably 0° to 25° C., for a time period varying between about 10 minutes and 6 hours depending on the reagent used, to produce a compound having the formula

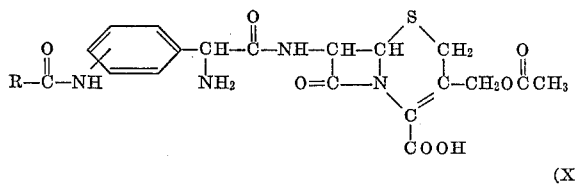

wherein R is (lower)alkyl.

The compounds of Formula X are useful in the treatment of infections caused by Gram-positive and Gram-negative bacteria such as *Diplococcus pneumoniae, Streptococcus pyogenes, Staphylococcus aureus* Smith, *Salmonella enteritidis, Salmonella typhosa, Klebsiella pneumoniae,* and others.

In the treatment of bacterial infections in man, the compounds of Formula X are administered orally or parenterally, in accordance with conventional procedures for antibiotic administration, in an amount of from about 5 to 60 mg./kg./day and preferably about 20 mg./kg./day in divided dosage, e.g., three or four times a day. They are administered in dosage units containing, for example 125 or 250 or 500 mg. of active ingredient with suitable physiologically acceptable carriers or excipients. The dosage units can be in the form of liquid preparations such as solutions, dispersions or emulsions or in solid form such as tablets, caspules, etc.

A preferred embodiment of the present invention is a compound having the formula

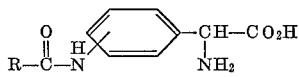

in which R is (lower)alkyl; and a mineral acid salt thereof; and including the D and L isomers.

More preferred compounds are those having the name D - α - amino-4-acetamidophenylacetic acid, D-α-amino-3-acetamidophenylacetic acid and D-α-amino-2-acetamidophenylacetic acid; and a mineral acid addition salt thereof.

Another preferred embodiment of the present invention is a compound having the formula

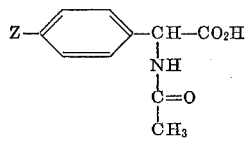

in which Z is —NH₂ or NO₂; and including the D- and L-isomers thereof.

Another preferred embodiment of the present invention is a compound having the formula

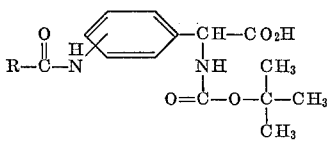

in which R is (lower)alkyl; and including the D- and L- isomers thereof.

A most preferred embodiment are the compounds having the names D-α-t-butoxycarboxamido-4-acetamidophenylacetic acid, D-α-t-butoxycarboxamido-3-acetamidophenylacetic acid and D-α-t-butoxycarboxamido-2-acetamidophenyl-acetic acid.

The following examples will serve to illustrate but not to limit the present invention.

DESCRIPTION OF THE PREFERRED EMBODIMENTS

Example I.—D-α-acetamido-phenylacetic acid

A suspension of 50 g. (0.331 mole) of D-(-)-2-phenylglycine in 700 ml. of water was cooled to 0 to 5° and 13.2 g. (0.331 mole) of sodium hydroxide was added with stirring to produce a solution. Acetic anhydride (67.5 g., 0.662 mole) was added rapidly in one portion to the vigorously stirred solution which was initially cooled to 0 to 5° C. by means of a salt-ice cooling bath. This was immediately followed by the addition of a solution of 39.7 g. (0.993 mole) of sodium hydroxide in 200 ml. of water in a rapid stream from a dropping funnel. The temperature rose to a maximum of about 25° C. The solution was stirred for an additional fifteen minutes in the cooling bath and then acidified with concentrated hydrochloric acid. The precipitated product was collected by filtration, washed on the filter with water and recrystallized from 1:1 95% ethanol-water; yield 46.0 g. (72%), M.P. 186–188° C., $[\alpha]_D^{24°} = -217.9°$ (C. 1%—EtOH). Reference—Beilstein, 14, 591.

Example II.—D-α-acetamido-4-nitrophenylacetic acid

D-α-acetamido-phenylacetic acid (20 g., 0.104 mole) was slowly added to 50 ml. of concentrated sulfuric acid with cooling as needed to maintain the temperature at 20 to 25° C. The mixture was stirred for about 20 minutes until most of the solid dissolved. Nitric acid (90%, d.=1.5, 9.7 ml. 0.208 mole) was added dropwise at such a rate to the stirred mixture that the salt-ice cooling bath maintained the temperture in the range 0 to −5° C. The reaction mixture was stirred at −5 to −10° C. for an additional 30 minutes and then poured onto about 300 g. of ice flakes. The white crystalline product was collected by filtration, washed with water and recrystallized three times from 1:1 95% ethanol-water; M.P. 180–182° C. dec., yield 11.5 g. (46.4%). An additional recrystallization from ethyl acetate did not change the melting point; $[\alpha]_D^{24} = -206.4°$ (C. 5%—EtOH).

*Analysis.*—Calcd. for $C_{10}H_{10}N_2O_5$ (percent): C, 50.42; H, 4.23; N, 11.76. Found (percent): C, 50.14; H, 4.07; N, 11.96.

Example III.—D-α-acetamido-4-aminophenylacetic acid

A solution of 15 g. (0.062 mole) of D-α-acetamido-4-nitrophenylacetic acid in 250 ml. of 95% ethanol was hydrogenated in the presence of 0.6 g. of 5% palladium on carbon on a Paar hydrogenator at an initial pressure of 50 p.s.i. for 64 minutes. The product had crystallized from the hydrogenation mixture. Approximately 200 ml. of water was added, the mixture warmed to dissolve the product and the catalyst removed by filtration. Chilling the filtrate gave 9.9 g. of product, M.P. 192–195° C. dec. The product was recrystallized four times from 1:1 95% ethanol-water, weight 4.8 g., M.P. 207–209° C. dec., $[\alpha]_D^{24°} = -182.2°$ (C. 0.5%—1 N HCl).

*Analysis.*—Calcd. for $C_{10}H_{12}N_2O_3$ (percent): C, 57.71; H, 5.81; N, 13.46. Found (percent): C, 57.61, 57.64; H, 5.67; N, 13.18.

Example IV.—D-α-amino-4-acetamidophenylacetic acid

D-α-acetamido-4-aminophenylacetic acid (39.2 g., 0.188 mole) in 400 ml. of 2 N hydrochloric acid was refluxed for 2 hours. The mixture was concentrated to dryness at reduced pressure. Water was added and the solution again concentrated to dryness. This was repeated once. The crystalline residue was slurried with 2-propanol, filtered, and washed additionally with 2-propanol giving, after air drying, 47 g. of the hydrochloride of D-α-amino-4-aminophenylacetic acid.

Ten g. of the hydrochloride in 40 ml. of water was adjusted to pH 4.8 with 20% sodium hydroxide. Crystalline D-α-amino-4-aminophenylacetic acid separated. To the solution obtained by adding 160 ml. additional of water was added 10 ml. of thioacetic acid. The mixture was stirred for 17 hours at 24° C. under a nitrogen atmosphere. The reaction mixture, containing a quantity of crystalline product, was concentrated to one-half of its initial volume giving 4.5 g. of product. The crude product was suspended in water, the suspension adjusted to pH 4.6 with 20% NaOH, heated to 95°, decolorized with carbon, and the product alowed to crystallize in the cold overnight. The resulting gelatinous mass was broken up by warming. The solid was removed by filtration; weight 0.2 g., M.P. 203–206° C. dec. The filtrate was diluted with an equal volume of 95% ethanol giving 1.4 g. of D-α-amino-4-acetamidophenylacetic acid; M.P. 214–215° C. dec., [α]$_D^{24°}$=−133.4° (C. 0.5—1 N HCl).

*Analysis.*—Calcd. for $C_{10}H_{12}N_2O_3$ (percent): C, 57.71; H, 5.81; N, 13.46. Found (percent): C, 56.80, 56.72; H, 5.84, 5.89; N, 13.62; Karl Fisher—$H_2O$, 1.32.

Found values corrected for 1.32% water: C, 57.52; H, 5.71; N, 13.80.

Example V.—D-α-t-butoxycarboxamido-4-acetamidophenylacetic acid

A mixture of D-α-amino-4-acetamidophenylacetic acid (Example IV) (0.0205 mole), 3.2 g. (0.022 mole) of t-butoxy-carbonyl azide, 1.65 g. (0.041 mole) of magnesium oxide and 100 ml. of 50% aqueous dioxane was stirred for 20 hours under a nitrogen atmosphere. The reaction mixture was poured into 400 ml. of ice water plus 300 ml. of ethyl acetate. The ethyl acetate phase was twice extracted with dilute aqueous sodium bicarbonate solution, the extracts being combined with the aqueous phase. The aqueous phase was acidified to pH 4 with 52% phosphoric acid and extracted with five 100-ml. portions of ethyl acetate. The combined and dried (sodium sulfate) ethyl acetate extract was stripped of solvent at reduced pressure. A solution of the residue in a minimum amount of chloroform was added to a large volume of "Skellysolve B" (petroleum solvent, B.P. 60–68° C., essentially n-hexane) to yield 5.6 g. of D-α-t-butoxycarboxamido-4-acetamidophenylacetic acid as an amorphous solid. The infrared and nuclear magnetic resonance (NMR) spectra were consistent with the desired product.

Example VI.—7-[D-α-amino-(4-acetamidophenylacetamido)]-cephalosporanic acid

A solution of 5.6 g. (0.0182 mole) of D-α-t-butoxycarboxamido-4-acetamidophenylacetic acid and 2.58 ml. (0.0182 mole) of triethylamine in 50 ml. of tetrahydrofuran was cooled to −45° C. (crystallization) and 2.04 ml. (0.0182 mole) of trichloroacetyl chloride was added dropwise during 5 minutes at −45° C. After stirring for 10 minutes a cold (−50°) filtered solution of 4.96 g. (0.0182 mole) of 7-aminocephalosporanic acid and 5.1 ml. (0.0364 mole) of triethylamine in 250 ml. of methylene chloride was added in one portion. The reaction mixture was stirred at −45° C. for one-half hour, then the cooling bath was removed and the temperature allowed to rise to 0°. The solvent was removed at reduced pressure. Water and ether were added to the residue. The ether phase was extracted once with aqueous sodium bicarbonate solution and the extract combined with the aqueous phase. The aqueous solution was acidified with 42% phosphoric acid and extracted twice with ethyl acetate. The combined ethyl acetate extracts were twice washed with water, dried over anhydrous sodium sulfate and the solvent removed at reduced pressure. Trituration of the residue gave a solid which was dissolved in chloroform. Crystalline 7-[D-α-t-butoxycarboxamido-(4-acetamidophenyl - acetamido)] - cephalosporanic acid separated; weight 2.6 g.

7 - [D - α - t - butoxycarboxamido - (4 - acetamidophenylacetamido)]-cephalosporanic acid (2.45 g.) was added to 74 ml. of 45% aqueous formic acid and the solution was stirred at 40° for 3 hours. The water and formic acid were distilled off at reduced pressure, toluene finally being added and distilled off to remove any remaining water and formic acid. The residue was triturated with wet ethyl acetate, concentrated somewhat to remove water, finally more ethyl acetate was added giving a filterable solid. The solid was triturated with 95% ethanol yielding, after drying in vacuo over phosphorus pentoxide, 1.4 g. of 7-[D-α-amino-(4-acetamidophenylacetamido)]- cephalosporanic acid. The infrared and nuclear magnetic resonance spectra were consistent with the desired product.

Minimum inhibitory concentration (M.I.C.) against: *D. pneumoniae*+5% serum—2.5 mcg./ml.; *S. pyogenes*— 0.16 mcg./ml.; *Sal. typhosa*—3.1 mcg./ml.

Example VII.—D-α-amino-3-aminophenylacetic acid

A solution of 9.8 g. (0.05 mole) of D-α-amino-3-nitrophenylacetic acid [P. Friis and A. Kjaer, Acta Chimica Scand. 17, 2391 (1963); British patent specification 1,- 033,257] in 200 ml. of water was prepared by adjusting the mixture to pH 9.3 with concentrated ammonium hydroxide. The solution was hydrogenated for 1 hour in the presence of 0.4 g. of 5% palladium on carbon on a Paar hydrogenation apparatus at an initial pressure of 50 p.s.i. The vessel was cooled as needed to keep the temperature from going above 30° C. After 1 hour an additional 0.4 g. of catalyst was added and hydrogenation continued for 1 hour longer. Three additional runs were made hydrogenating a total of 39.4 g. of nitro compound. Addition of the second amount of catalyst was omitted in the additional runs and a hydrogenation time of about 1 hour was used. Each run was filtered to remove catalyst, the filtrates pooled and concentrated to a small volume until crystallization of the product started. The concentrate was diluted with about five volumes of 95% ethanol, the mixture stored overnight in the cold and the product filtered and washed further by slurring with 95% ethanol. After drying in a vacuum oven for 3 hours at 40° C. and the in vacuo over phosphorus pentoxide for 64 hours there was obtained 25.7 g. of D-α-amino-3-aminophenylacetic acid; M.P. 188–191° C., [α]$_D^{24°}$=−139.0 (C. 1 in HCl).

Example VIII.—D-α-amino-3-acetamidophenylacetic acid

A mixture of 5 g. (0.0301 mole) of D-α-amino-3-amino-phenylacetic acid and 5 ml. of thioacetic acid in 100 ml. of water was stirred for 16 hours under a nitrogen atmosphere. The mixture was heated on a steam bath for one-half hour and then concentrated at reduced pressure to a small volume. On cooling the concentrate, the product started to crystallize. The concentrate was diluted with 95% ethanol and, after chilling in an ice bath, the product was filtered and washed with 95% ethanol; weight 1.8 g. The filtrate was further diluted with 95% ethanol giving an additional 2.3 g. of product. The two crops of product were combined, dissolved in a small amount of water by warming, the soltuion concentrated slightly and diluted with a large volume of 95% ethanol. The initial crop of solid was removed by filtration and the filtrate stored in the cold for 16 hours giving after drying at 65° C. for 3 hours in vacuo over phosphorus pentoxide, 0.90 g. of product, M.P. 185–187° C. dec. The product was twice recrystallized from 1:1 95% ethanol-water; weight 0.35 g., M.P. 186–187° C. dec., [α]$_D^{24°}$=−120° (C. 0.5–1 N HCl).

*Analysis.*—Calcd. for $C_{10}H_{12}N_2O_3$ (percent): C, 57.7; H, 5.81; N, 13.5. Found (percent): C, 47.29; H, 6.79; N, 11.21; $H_2O$, 18.3.

Found values corrected for 18.3% water: C, 57.9; H, 5.83; N, 13.7.

Example IX.—D-α-t-butoxycarboxamido-3-acetamidophenylacetic acid.

D-α-amino - 3 - acetamidophenylacetic acid (6.9 g., 0.0331 mole), 2.67 g. (0.0662 mole) of magnesium oxide and 5.23 g. (0.0365 mole) of 6-butoxycarbonyl azide were combined in 84 ml. of 50% aqueous dioxane. After 15 minutes of stirring, an additional 40 ml. of 50% aqueous dioxane was added. The mixture was stirred at 45 to 50° for 24 hours. The reaction mixture was poured into 400 ml. of cold water plus 30 ml. of ethyl acetate; the whole was then filtered to remove a small amount of insoluble material. The ethyl acetate phase was once extracted with dilute aqueous sodium bicarbonate and this combined with the aqueous phase. The cold aqueous solution was adjusted to pH 4 with 42% phosphoric acid and extracted with ethyl acetate. The ethyl acetate extract was washed three times with water, dried with anhydrous sodium sulfate and stripped of solvent at reduced pressure. The residue was dissolved in anhydrous ether and diluted with "Skellysolve B" giving 5.9 g. of D-α-t-butoxycarboxamido-3-acetamidophenylacetic acid as an amorphous solid. The infrared and nuclear magnetic resonance spectra were consistent with the desired product.

Example X.—D-α-amino-2-nitrophenylacetic acid.

Seventy-five grams of 2-nitrophenylacetic acid is treated with 100 grams of thionyl chloride at 60° C. followed by the addition of 23 ml. of bromine in the presence of ultraviolet light to yield α-bromo-2-nitrophenylglycine. The product is purified by vacuum distillation. The resultant α-bromo acid chloride is decomposed to the carboxylic acid by water, followed by crystallization to produce purified α-bromo-2-nitrophenylacetic acid.

The α-bromo-2-nitrophenylacetic acid is dissolved in liquid ammonia or 12% ammonia for up to 24 hours.

The ammonia is evaporated in vacuo and the resultant residue is adjusted to pH 4–5 with hydrochloric acid. The product is collected by filtration or extraction, purified by crystallization, and resolved into the d and l forms, i.e., d- or l-α-amino-2-nitrophenylacetic acid by methods described in the chemical literature. Bette & Mayer, Ber. 41, 2073 (1908); Ingersoll & Adams, J. Am. Chem. Soc., 47, 1168 (1925); Kuna, Ovakirinan arnd Levene, J. Biol. Chem. 137, 334 (1941). The above procedure is comparable to that described in K. Heyns and H. Schultz, Ann 611, 40 (1958).

Example XI.—D-α-acetamido-2-nitrophenylacetic acid

A suspension of 1 mole of D-α-amino-2-nitrophenylacetic acid in 1 liter of water is cooled to about 0° C. and 1 mole of sodium hydroxide is added to produce a solution. Acetic anhydride, 2 moles, is added in one portion to the vigorously stirred soltuion which is cooled to 0°–5° C. by means of a salt-ice bath. An immediate addition of 3 moles of sodium hydroxide in aqueous solution is made by dropping funnel. The temperature is allowed to rise to about 25° C. The solution is stirred about fifteen minutes and then cautiously acidified with concentrated hydrochloric acid. The precipitated product is collected by filtration, washed with water, and recrystallized from 1:1 95% ethanol-water to produce D-α-acetamido-2-nitrophenylacetic acid.

Example XII.—D-α-acetamido-2-aminophenylactic acid

Substitution in the procedure of Example III for the D-α-acetamido-4-nitrophenylacetic acid used therein of D-α-acetamido-2-ntrophenylacetic acid produces D-α-acetamido-2-aminophenylacetic acid.

Example XIII.—D-α-amino-2-acetamidophenylacetic acid

Substitution in the procedure of Example IV for the D-α-acetamido-4-aminophenylacetic acid used therein of D-α-acetamido-2-aminophenylacetic acid produces D-α-amino-2-acetamido-phenylacetic acid.

Example XIV.—D-α-t-butoxycarboxamido-2-acetamidophenylacetic acid

Substitution in the procedure of Example V for the D-α-amino-4-acetamidophenylacetic acid used therein of D-α-amino-2-acetamidophenylacetic acid produces D-α-t-butoxycarboxamido-2-acetamidophenylacetic acid.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:
1. A compound having the formula

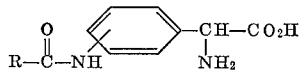

wherein R is (lower)alkyl; and the D- and L-isomers thereof.

2. The compound of claim 1 having the name D-α-amino-3-acetamidophenylacetic acid.
3. The compound of claim 1 having the name D-α-amino-3-aceetamidophenylacetic acid.
4. The compound of claim 1 having the name D-α-amino-2-acetamidophenylacetic acid.
5. The compound having the formula

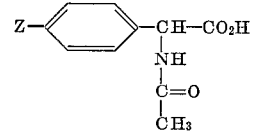

in which Z is —NH$_2$ or —NO$_2$; and the D and L isomers thereof.

6. A compound having the formula

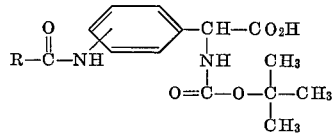

in which R is (lower)alkyl; and the D and L isomers thereof.

7. The compound of claim 6 having the name D-α-t-butoxycarboxamido-4-acetamidophenylacetic acid.
8. The compound of claim 6 having the name D-α-t-butoxycarboxamido-3-acetamidophenylacetic acid.
9. The compound of claim 6 having the name D-α-t-butoxycarboxamido-2-acetamidophenylacetic acid.

References Cited

UNITED STATES PATENTS 3,422,103   1/1969   Wall et al. _____ 260—518

LORRAINE A. WEINBERGER, Primary Examiner

L. A. THAXTON, Assistant Examiner

U.S. Cl. X.R.

260—518